(12) United States Patent
Takajou

(10) Patent No.: US 9,235,184 B2
(45) Date of Patent: Jan. 12, 2016

(54) HIGH-VOLTAGE POWER SUPPLY APPARATUS AND IMAGE FORMING APPARATUS

(71) Applicant: CANON KABUSHIKI KAISHA, Tokyo (JP)

(72) Inventor: Toshiki Takajou, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/326,159

(22) Filed: Jul. 8, 2014

(65) Prior Publication Data

US 2015/0016164 A1    Jan. 15, 2015

(30) Foreign Application Priority Data

Jul. 12, 2013    (JP) .................................. 2013-146374

(51) Int. Cl.
*G03G 15/00*    (2006.01)
*H02M 3/156*    (2006.01)
*H02M 7/10*    (2006.01)
*H04N 1/00*    (2006.01)

(52) U.S. Cl.
CPC ............... *G03G 15/80* (2013.01); *H02M 3/156* (2013.01); *H02M 7/103* (2013.01); *H04N 1/00885* (2013.01)

(58) Field of Classification Search
CPC ...... G03G 15/80; G03G 15/5004; H02M 7/06
USPC ................................................ 399/37, 88–90
See application file for complete search history.

(56) References Cited

U.S. PATENT DOCUMENTS

2013/0114970 A1*    5/2013    Minobe ........................... 399/88

FOREIGN PATENT DOCUMENTS

JP    2012-120439 A    6/2012

* cited by examiner

*Primary Examiner* — Hoang Ngo
(74) *Attorney, Agent, or Firm* — Fitzpatrick, Cella, Harper & Scinto

(57) ABSTRACT

The high-voltage power supply apparatus includes an inductor to be applied with a voltage when a driving unit is driven by a drive signal at a predetermined frequency, a rectification unit connected to both ends of the inductor, the rectification unit including multiple capacitors and multiple diodes, a current detection unit configured to detect a current flowing through the rectification unit, and a control unit configured to control a duty of the drive signal based on a result of detection by the current detection unit.

10 Claims, 11 Drawing Sheets

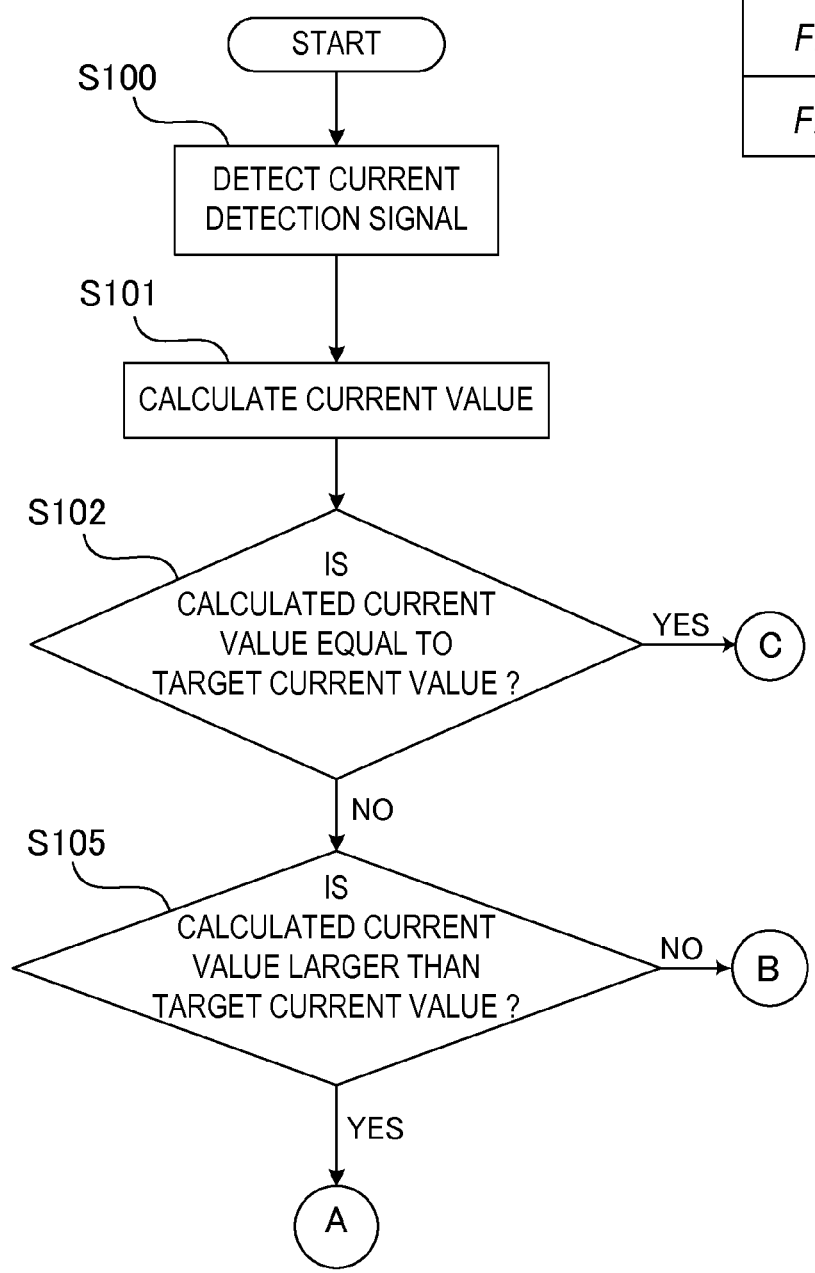

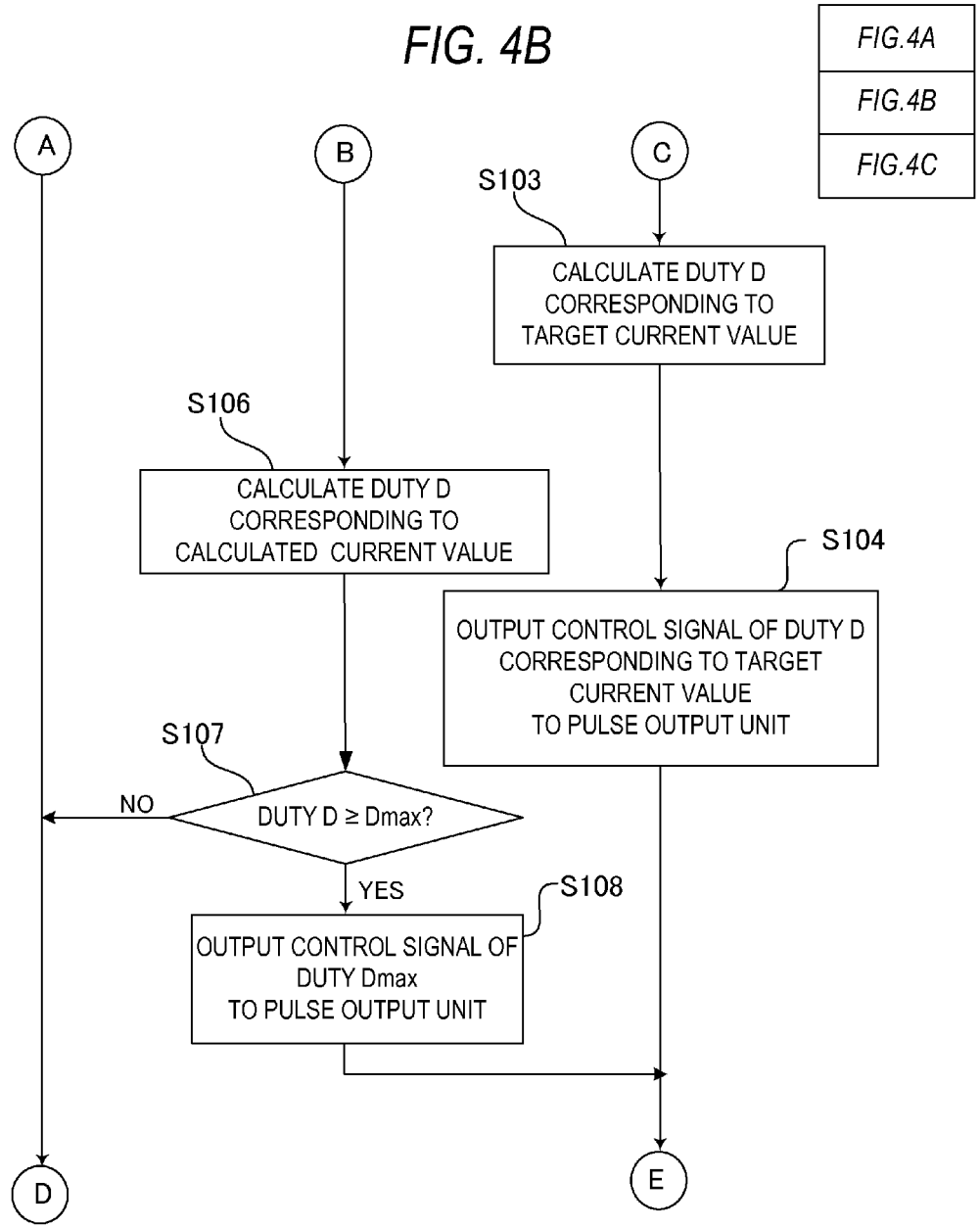

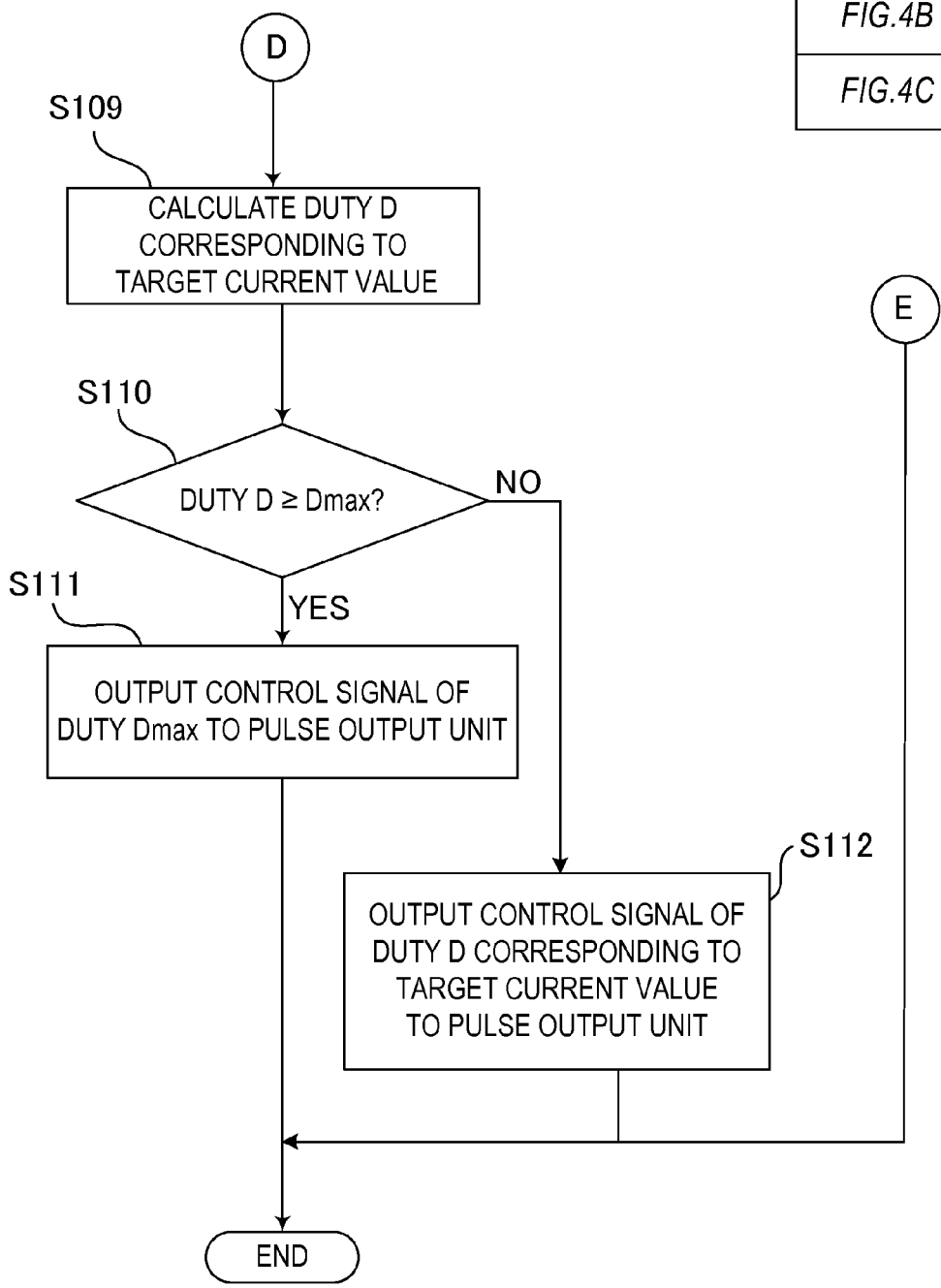

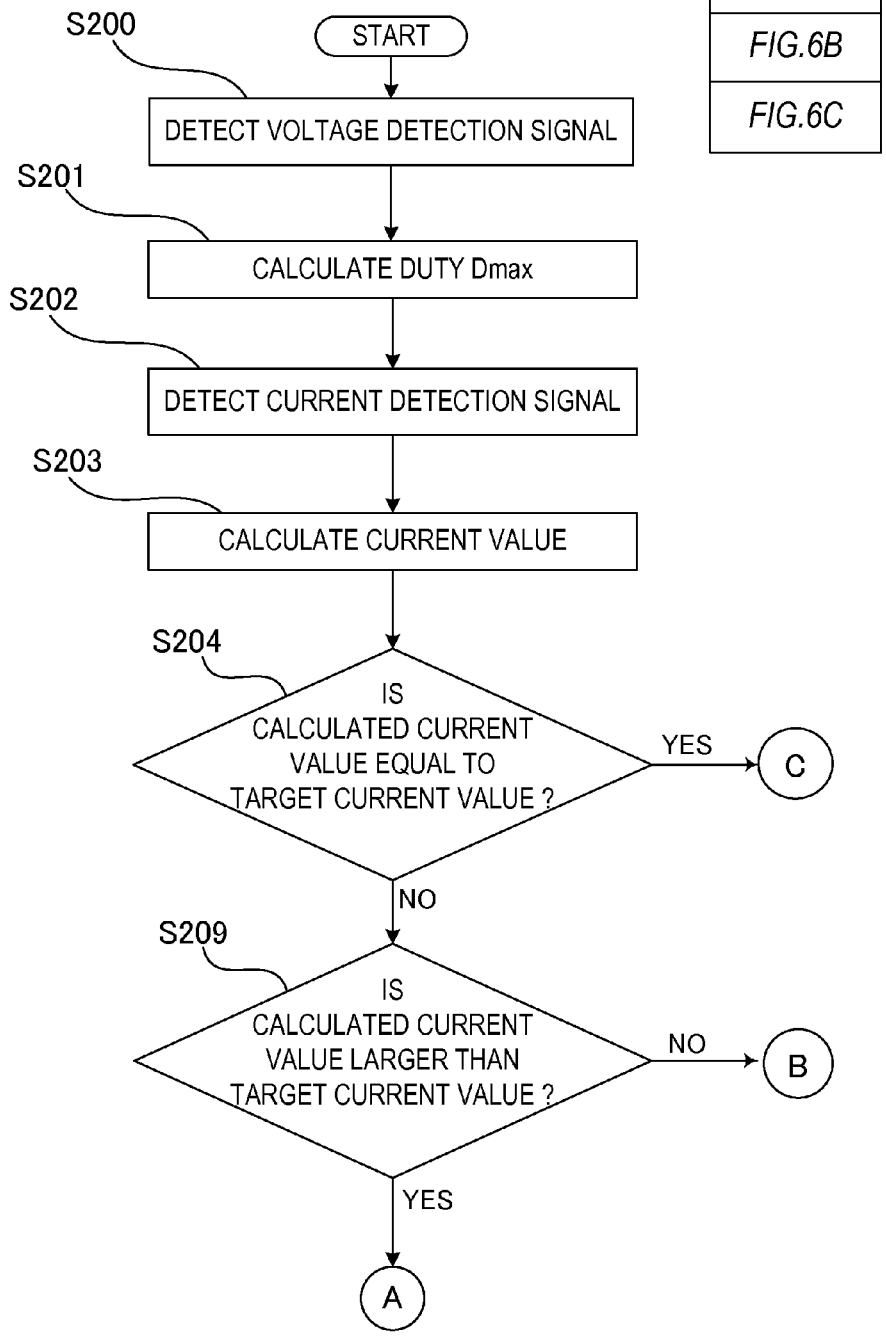

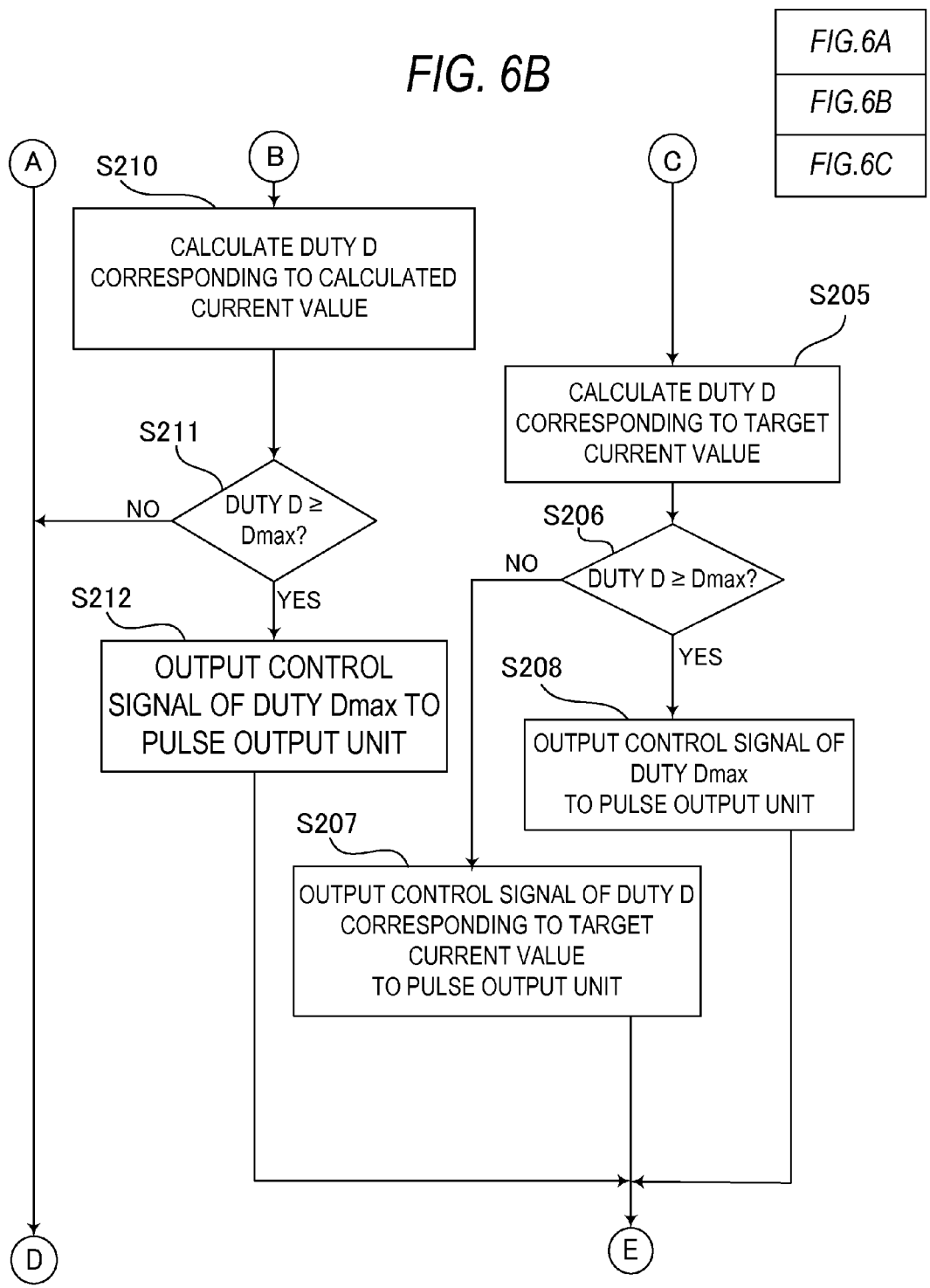

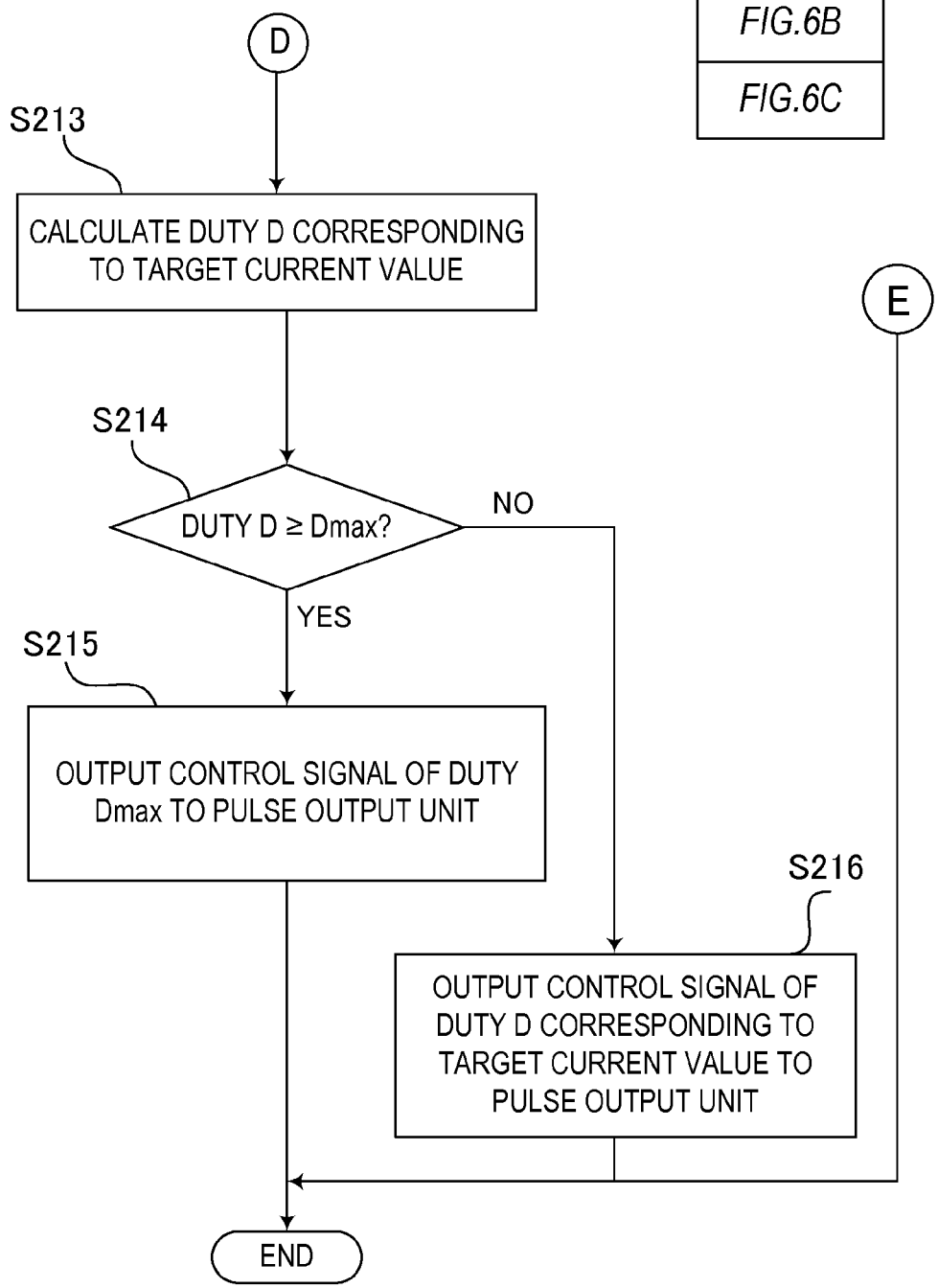

HIGH-VOLTAGE POWER SUPPLY APPARATUS AND IMAGE FORMING APPARATUS

BACKGROUND OF THE INVENTION

1. Field of the Invention

The present invention relates to a high-voltage power supply apparatus used for an image forming apparatus or the like, and to an image forming apparatus including the high-voltage power supply apparatus.

2. Description of the Related Art

In the related art, there is known an electrophotographic image forming apparatus as an image forming apparatus such as a copying machine, a printer, or a fax machine. In the electrophotographic image forming apparatus, a high voltage is applied to a charging member for uniformly charging an image bearing member and to a developing member for developing a latent image formed on the image bearing member by using toner as developer. Further, in the electrophotographic image forming apparatus, a transfer member for transferring a toner image formed on the image bearing member onto a recording material is also applied with a high voltage so as to form an image. A high voltage used for forming an image is generated by a high-voltage power supply apparatus, and a technology for applying a high voltage to each member is described in, for example, Japanese Patent Application Laid-Open No. 2012-120439.

FIG. 1 is a circuit diagram of a high-voltage power supply apparatus described in Japanese Patent Application Laid-Open No. 2012-120439. In the high-voltage power supply apparatus illustrated in FIG. 1, a drive signal having a fixed switching frequency and a variable pulse duty is input to a switching element Q101 for driving a voltage resonance circuit so as to control an output voltage Vout. Note that, detailed description of FIG. 1 is given in a first embodiment of the present invention. In FIG. 1, when a load 110 is short-circuited, a controller 101 sets the duty for driving the switching element Q101 to 100% in order to supply larger current to the load 110. In this way, larger current is supplied to the load 110, but there is a problem in that a circuit component may be broken down because current larger than a rated current value flows through an inductor L100 or the switching element Q101. In addition, for example, by disposing a current detection circuit for detecting current flowing through the inductor L100 or the switching element Q101 so as to stop to drive the switching element when overcurrent is detected, it is possible to prevent the circuit component from being broken down. However, when the circuit is added, a circuit scale is increased, and hence there occur problems in that downsizing of the high-voltage power supply apparatus is affected, and cost is increased due to the addition of the circuit.

SUMMARY OF THE INVENTION

The present invention has been made in view of this circumstance, and the present invention is capable of preventing a breakdown of a switching element when a load varies, with a simple structure.

The purpose of the present invention is to provide a high-voltage power supply apparatus for generating a high voltage, including a driving unit driven by a drive signal at a predetermined frequency, an inductor connected to the driving unit, wherein a voltage is applied into the inductor by driving the driving unit, a rectification unit connected to both ends of the inductor, the rectification unit including capacitors and diodes, a current detection unit that detects a current flowing through the rectification unit, a control unit that controls a duty of the drive signal based on a result of detection by the current detection unit.

The purpose of the present invention is to provide an image forming apparatus including an image forming unit that forms an image, and a high-voltage power supply that supplies a high voltage to the image forming unit, wherein the high-voltage power supply includes, a driving unit driven by a drive signal at a predetermined frequency, an inductor connected to the driving unit, wherein a voltage is applied to the inductor by driving the driving unit, a rectification unit connected to both ends of the inductor, the rectification unit including capacitors and diodes, a current detection unit detects a current flowing through the rectification unit; and a control unit that controls a duty of the drive signal based on a result of detection by the current detection unit.

Further features of the present invention will become apparent from the following description of exemplary embodiments with reference to the attached drawings.

BRIEF DESCRIPTION OF THE DRAWINGS

FIG. 4 is comprised of FIGS. 4A, 4B and 4C, showing flowcharts illustrating a control sequence of a drive signal according to the first embodiment.

FIG. 6 is comprised of FIGS. 6A, 6B and 6C, showing flowcharts illustrating a control sequence of a drive signal according to the second embodiment.

DESCRIPTION OF THE EMBODIMENTS

Now, embodiments of the present invention are described in detail with reference to the drawings.

First Embodiment

Structure of High-Voltage Power Supply Apparatus

Figure 1:
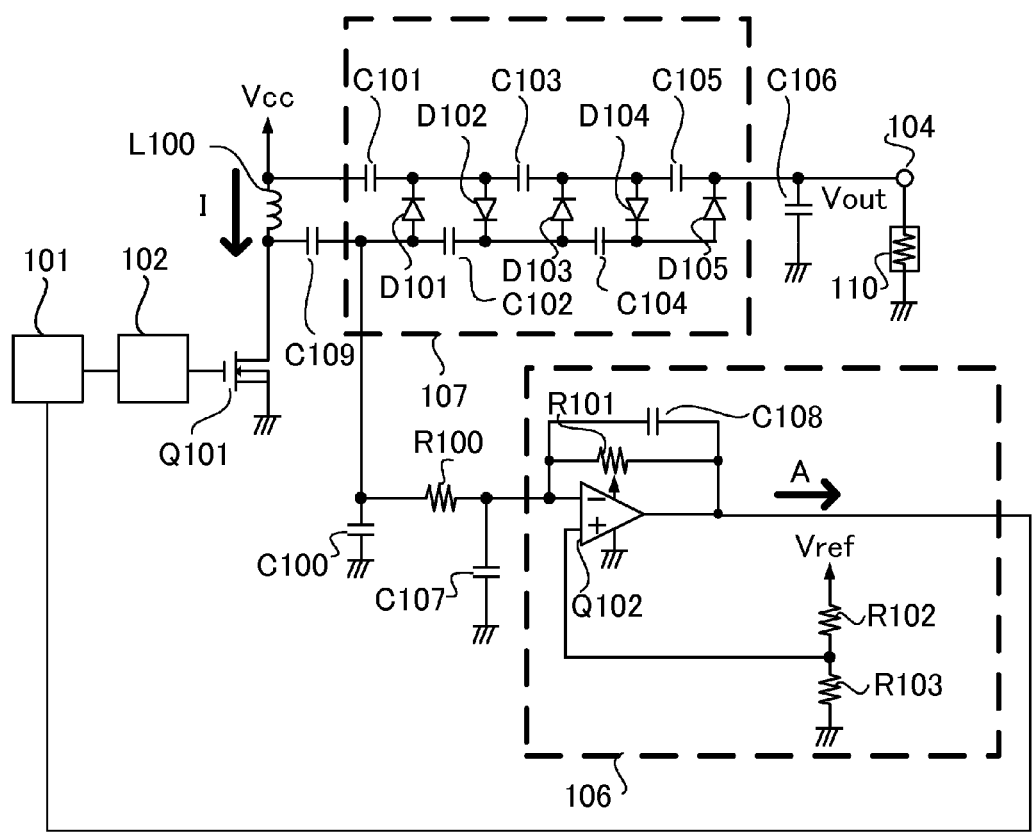
FIG. 1 is a circuit diagram of a high-voltage power supply apparatus according to a first embodiment of the present invention.

FIG. 1 is a circuit diagram of a high-voltage power supply apparatus for outputting a high voltage without using a transformer according to a first embodiment of the present invention. With reference to FIG. 1, a structure and an operation of the high-voltage power supply apparatus are described below.

(Voltage Resonance Circuit)

In FIG. 1, an inductor (also referred to as a reactor) L100 and a capacitor C100 constitute a voltage resonance circuit as a voltage resonance unit. One end of the inductor L100 is connected to a switching element Q101 as a switching unit for driving the voltage resonance circuit, and the other end of the inductor L100 is connected to a power supply voltage Vcc. The inductor L100 is an element having an inductance component to which a voltage is intermittently applied when the switching element Q101 is driven (turned on and off). When the voltage is applied to the inductor L100, a current I flows through the inductor L100. Further, in this embodiment, the switching element Q101 is a field-effect transistor (MOSFET) and referred to as a MOSFET Q101 in the following description. In addition, one end of the capacitor C100 is connected to the ground. Further, a voltage generated by the voltage resonance circuit is referred to as a resonance voltage Vd and is also referred to as a flyback voltage in the following description.

(Rectification Circuit)

The flyback voltage output from the voltage resonance circuit is rectified to be a positive voltage by a rectification circuit 107 as a rectification unit for rectifying the flyback voltage. In this embodiment, as illustrated in FIG. 1, the rectification circuit 107 is described as a multistage voltage doubler rectification circuit having a structure in which five diodes and five capacitors constitute the rectification circuit (also referred to as a five-stage structure).

In the rectification circuit 107, the flyback voltage having a positive polarity is extracted by a diode D101 for causing a current to flow in a forward direction and a capacitor C101 having one end connected to a cathode terminal of the diode D101 and the other end connected to the power supply voltage Vcc so as to be charged. In FIG. 1, there is illustrated a structure in which one end of the capacitor C101 is connected to a terminal of the inductor L100 on the power supply voltage Vcc side, and the other end of the capacitor C101 is connected to the cathode terminal of the diode D101. Further, multiple diodes D102, D103, D104, and D105, and multiple capacitors C102, C103, C104, and C105 are disposed so as to constitute the rectification circuit 107 having multiple stages. Then, the voltage output from the rectification circuit 107 is smoothed by a smoothing capacitor C106 having one end connected to the ground.

As illustrated in FIG. 1, the rectification circuit 107 is connected to both ends of the inductor L100 via a capacitor C109, the inductor L100 and the capacitor C100 constituting the voltage resonance circuit. One end of the capacitor C109 is connected to a node between the inductor L100 of the voltage resonance circuit and the MOSFET Q101. Because the capacitor C109 has a capacitance sufficiently larger than that of the capacitor C100, it is considered that an influence of the capacitor C109 to the voltage resonance circuit can be almost ignored.

The rectification circuit 107 is connected to an output terminal 104, which outputs a DC voltage. This DC voltage is applied to a load 110 that requires a high voltage. The load 110 is, for example, a developing unit, a transfer unit, and the like for forming an image in the image forming apparatus.

In this way, in the high-voltage power supply apparatus illustrated in FIG. 1, the voltage resonance circuit including the inductor L100 and the capacitor C100 generates the flyback voltage, and the multistage rectification circuit 107 rectifies the flyback voltage and steps up the voltage so that higher voltage can be output. Further, a step-up amount of the voltage value to be output can be determined by adjusting the number of stages of the rectification circuit 107 in accordance with the high voltage required for the load 110.

(Current Detection Unit)

Next, a structure and an operation of a current detection unit for detecting a current flowing through the load are described. In FIG. 1, the voltage resonance circuit is connected to the multistage rectification circuit 107 via the capacitor C109. Because the capacitor C109 is disposed, an alternating current flow in the voltage resonance circuit and a direct current flow in the rectification circuit 107 can be separated from each other without disturbing an alternating current flow between the inductor L100 and the capacitor C100 constituting the voltage resonance circuit. The structure of this embodiment has a feature in that the alternating current flow in the voltage resonance circuit and the direct current flow in the rectification circuit 107 can be separated from each other by disposing the capacitor C109. Thus, the current flowing through a current detection unit 106 described later becomes the separated current flow in the rectification circuit 107 and is equal to the current flowing through the load. Therefore, the current flowing through the load 110 can be correctly detected by the current detection unit 106.

As illustrated in FIG. 1, the current detection unit 106 is a circuit including an operational amplifier Q102, resistors R101, R102, and R103, and a capacitor C108, for setting an offset potential. An input side of the current detection unit 106 is connected via a resistor R100 to a node between the inductor L100 and the capacitor C100 of the voltage resonance circuit. The operational amplifier Q102 has a non-inverting input terminal (+) connected to the resistors R102 and R103 for setting an offset potential, which is supplied with a predetermined voltage and is controlled to have the same potential as that of an inverting input terminal (−) thereof. Further, the predetermined voltage is a voltage obtained by dividing a reference voltage Vref by the voltage dividing resistors R102 and R103. In addition, the resistor R100 and a capacitor C107 are disposed for preventing the alternating current of the voltage resonance circuit from being superimposed on the inverting input terminal (−) of the operational amplifier Q102. Further, the capacitor C108 has a function of reducing an AC gain of the operational amplifier Q102. Because the current flowing through the load 110 is the same as the current flowing through the current detection unit 106, the operational amplifier Q102 outputs a current detection signal A having a voltage value corresponding to a detected current value. A voltage value VA of the current detection signal A is expressed by the following equation:

$$\text{Voltage Value } VA = R101 \times i1 + \{Vref \times R103/(R102+R103)\},$$

where i1 represents a current value of the current flowing through the load 110. Therefore, by monitoring the current detection signal A, it is possible to detect a current value flowing through the load 110.

(Controller and Pulse Output Unit)

In this embodiment, the controller 101 controls a voltage value of the high voltage to be output by adjusting, via a pulse output unit 102, a duty (ratio between on time and off time of the drive signal) D of the drive signal applied to a gate terminal of the MOSFET Q101. Further, in this embodiment, a frequency for driving the MOSFET Q101 is a predetermined frequency and is constant. In addition, the controller 101 includes a ROM and a RAM. The ROM stores a program and data for controlling the high-voltage power supply apparatus, and the RAM is a memory for a control program executed by the controller 101 to temporarily store information. The controller 101 reads the program stored in the ROM, drives the MOSFET Q101 via the pulse output unit 102, and controls generation of the high voltage.

As illustrated in FIG. 1, the current detection unit 106 detects the current flowing through the load 110 and outputs the current detection signal A as a result of the detection to the controller 101. The controller 101 outputs to the pulse output unit 102 a control signal with the duty D set based on the current detection signal A from the current detection unit 106. The pulse output unit 102 outputs the drive signal of the duty D set in the control signal output from the controller 101 to the gate terminal of the MOSFET Q101 so as to drive the MOSFET Q101.

Figure 2:
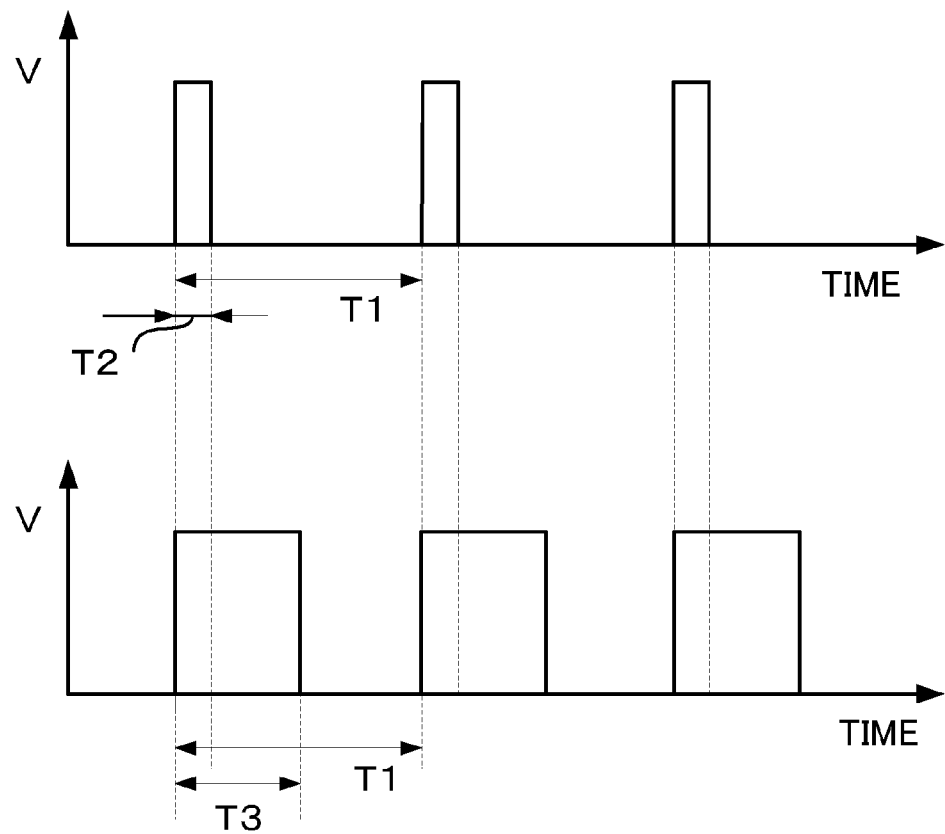
FIG. 2 is a timing chart showing drive signals output by a pulse output unit 102 of the first embodiment and a second embodiment of the present invention.

FIG. 2 is a timing chart showing drive signals output from the pulse output unit 102 to the gate terminal of the MOSFET Q101. In FIG. 2, the vertical axis indicates a voltage of the drive signal, and the horizontal axis indicates time. In FIG. 2, a cycle of the drive signal is denoted by T1, and time in which the drive signal is on state (also referred to as a time width or a pulse width) is denoted by T2 and T3. In addition, the above-mentioned duty D indicates, for example, a ratio of the time width T2 to the cycle T1 or a ratio of the time width T3 to the cycle T1. Further, because the frequency of the drive signal is constant as described above, the cycle T1 is also constant.

The upper part of FIG. 2 shows a waveform of the drive signal output from the pulse output unit 102, which is a pulse signal having the cycle T1 and the time width T2. As described above, the pulse output unit 102 changes the duty D of the output drive signal by the control signal from the controller 101. As shown in the lower part of FIG. 2, for example, in a case where the drive signal is output with the time width T2, when a control signal for causing the pulse output unit 102 to output the drive signal having a larger duty D (with the time width T3) is input from the controller 101 to the pulse output unit 102, the time width is changed from T2 to T3.

Figure 3:
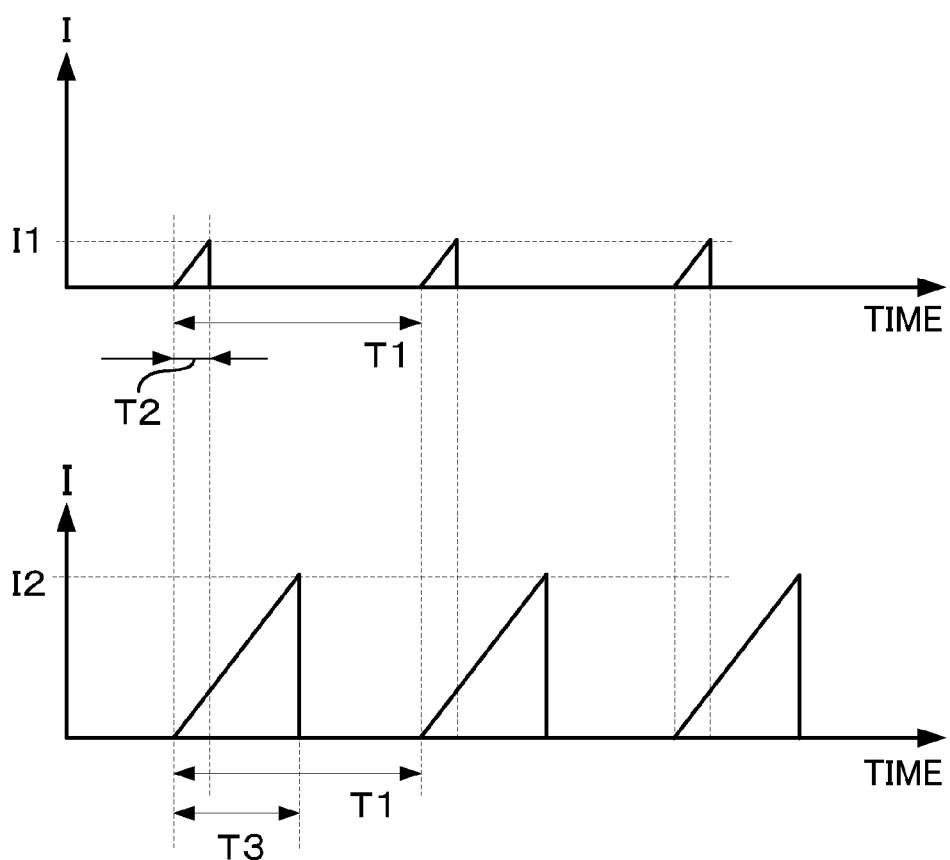
FIG. 3 is a timing chart showing a variation of a current value flowing through an inductor L100 of the first and second embodiments.

FIG. 3 is a timing chart showing a variation of the current value flowing through the inductor L100 when the drive signal is output to the gate terminal of the MOSFET Q101 from the pulse output unit 102.

In FIG. 3, the vertical axis indicates a current value I flowing through the inductor L100, and the horizontal axis indicates time.

In FIG. 3, similarly to FIG. 2, a cycle of the drive signal output from the pulse output unit 102 to the gate terminal of the MOSFET Q101 is denoted by T1, and time in which the drive signal is on state is denoted by T2 and T3.

While the gate terminal of the MOSFET Q101 is applied with the voltage of the drive signal (for example, the time widths T2 and T3), the MOSFET Q101 is on state and the current I flows through the inductor L100.

Then, also as for the current I of the drive signal flowing through the inductor L100, when the duty D changes, a peak current Ipeak of the current I also changes.

As shown in FIG. 3, for example, when the pulse output unit 102 outputs the drive signal of the time width T2, the peak current Ipeak flowing through the inductor L100 becomes I1. When the drive signal of the time width T3 is output, the peak current Ipeak becomes I2.

In this way, the controller 101 changes the duty D of the drive signal for driving the MOSFET Q101 based on the current detection signal A so as to control the current flowing through the load 110 to have a target current value.

However, as described above, when the load 110 is short-circuited in the circuit of FIG. 1, the controller 101 sets the duty D for driving the switching element Q101 to 100% in order to supply a larger current to the load 110. Thus, the load 110 is supplied with the large current. However, when a current larger than a rated current value flows through the inductor L100 or the switching element Q101, the circuit component may be broken down.

Therefore, in this embodiment, in the high-voltage power supply apparatus of FIG. 1, in order to prevent the MOSFET Q101 or the inductor L100 from being broken down by a current larger than an absolute maximum rating, a maximum value of the duty D adjusted by the controller 101 is set. Then, the controller 101 controls the output within the range.

[Calculation of Maximum Value of Duty D]

When calculating the maximum value of the duty D, one of the absolute maximum rated currents of the inductor L100 and the MOSFET Q101 having a smaller rated value is used for the calculation. In the following description, it is assumed that the absolute maximum rated current of the inductor L100 is smaller than the absolute maximum rated current of the MOSFET Q101.

A relationship among an inductance L of the inductor, the current I, and a voltage V is defined by the following equation.

$$V = -L \times (dI/dt) \qquad (1)$$

Further, the following equation is derived from the equation (1) described above:

$$Vcc = L \times (Imax/Tmax),$$

where Imax represents the absolute maximum rated current of the inductor L100, Vcc represents a voltage of the power supply voltage Vcc to which one end of the inductor L100 is connected, L represents the inductance of the inductor L100, and Tmax represents a maximum time period of the time in which the MOSFET Q101 is on state (corresponding to the time width or the pulse width of the drive signal).

By deforming the above-mentioned equation, the following equation is derived:

$$Tmax = |-L| \times (Imax/Vcc) \qquad (2),$$

where values of Imax and L are determined by specification of the inductor L100, and Vcc is determined by specification of the power supply voltage.

In addition, a relationship between a cycle T of the drive signal of the MOSFET Q101 and a maximum value Dmax of the duty D of the drive signal is represented by the following equation (3).

$$Dmax = Tmax/T \qquad (3)$$

As described above, because the frequency of the drive signal of the MOSFET Q101 is constant, the cycle of the drive signal also becomes a predetermined value, and the maximum value Dmax of the duty D is determined by the equation (3). The controller 101 sets the duty Dmax calculated by the equation (3) as the maximum value of the duty D and controls the drive signal so that the duty D of the drive signal does not exceed the maximum value Dmax.

[Control Sequence of Drive Signal]

Next, there is described a control sequence for the controller 101 to control the duty D of the drive signal for the MOSFET Q101 so as not to exceed the maximum value Dmax, with reference to a flowchart. FIGS. 4A to 4C are flowcharts illustrating the control sequence of the drive signal by the controller 101 in this embodiment. With reference to the flowcharts of FIGS. 4A to 4C, the control sequence of the drive signal is described.

In this embodiment, it is assumed that values of the absolute maximum rated current Imax of the inductor L100, the voltage Vcc, the inductance L of the inductor L100, and the cycle T of the drive signal are stored in the ROM, the values being used in the equations (2) and (3) for calculating the maximum duty Dmax. It is further assumed that, when the high-voltage power supply apparatus is powered on, the controller 101 reads the values from the ROM, calculates the maximum duty Dmax, and stores the calculated value in the RAM. In addition, the maximum duty Dmax may be calculated and stored in the ROM in advance, and the maximum duty Dmax may be read out from the ROM as necessary. In addition, it is assumed that a target current value It as the current value supplied from the high-voltage power supply apparatus to the load 110 is stored in the RAM and is changed in accordance with a state of the load 110. Further, the ROM of the controller 101 stores a table in which the current value flowing through the load 110 and the duty of the drive signal are associated with each other.

It is assumed that the control sequence illustrated in FIGS. 4A to 4C is started at the timing when the controller 101 controls the drive of the MOSFET Q101 via the pulse output unit 102 (for example, every drive cycle of the MOSFET Q101). First, in Step (hereinafter abbreviated as S) 100, the controller 101 detects the current detection signal A output from the current detection unit 106. In S101, because the detected current detection signal A is an analog signal, the controller 101 uses an A/D converter included therein for converting the current detection signal A into a digital value and calculates a current value Ad flowing through the load 110. For instance, when converting the current detection signal A into an 8-bit digital value, the analog signal A is converted into any digital value of 0 to 255 that can be expressed by 8 bits. Further, when converting into a digital value, it is possible to use a method of converting an analog signal into a digital value by rounding down decimal places of the analog value expressed by the analog signal.

In S102, the controller 101 determines whether or not the target current value It stored in the RAM is the same as the calculated current value Ad calculated in S101. When the controller 101 determines that the target current value It is the same as the calculated current value Ad, the process proceeds to S103. When the controller 101 determines that the target current value It is different from the calculated current value Ad, the process proceeds to S105. In S103, the controller 101 calculates the duty D corresponding to the target current value It stored in the RAM by using the table stored in the ROM described above. In S104, the controller 101 outputs the control signal having the duty D corresponding to the target current value It to the pulse output unit 102 and finishes the process.

In S105, the controller 101 determines whether or not the calculated current value Ad calculated in S101 is larger than the target current value It stored in the RAM. When the controller 101 determines that the calculated current value Ad is larger than the target current value It, the process proceeds to S109. When the controller 101 determines that the calculated current value Ad is smaller than the target current value It, the process proceeds to S106. In S106, the controller 101 calculates the duty D corresponding to the calculated current value Ad by using the table stored in the ROM described above. In S107, the controller 101 reads out the maximum duty Dmax stored in the RAM and determines whether or not the duty D corresponding to the calculated current value Ad is the maximum duty Dmax or larger. When the controller 101 determines that the duty D corresponding to the calculated current value Ad is the maximum duty Dmax or larger, the process proceeds to S108. When the controller 101 determines that the duty D corresponding to the calculated current value Ad is smaller than the maximum duty Dmax, the process proceeds to S109. In S108, the controller 101 outputs the control signal with the duty that is the maximum duty Dmax to the pulse output unit 102 and finishes the process.

In S109, the controller 101 calculates the duty D corresponding to the target current value It by using the table stored in the ROM described above. In S110, the controller 101 reads out the maximum duty Dmax stored in the RAM and determines whether or not the duty D corresponding to the target current value It is the maximum duty Dmax or larger.

When the controller 101 determines that the duty D corresponding to the target current value It is the maximum duty Dmax or larger, the process proceeds to S111. When the controller 101 determines that the duty D corresponding to the target current value It is smaller than the maximum duty Dmax, the process proceeds to S112. In S111, the controller 101 outputs the control signal with the duty that is the maximum duty Dmax to the pulse output unit 102 and finishes the process. In S112, the controller 101 outputs the control signal with the duty D corresponding to the target current value It to the pulse output unit 102 and finishes the process.

By the control described above, the current I flowing through the inductor L100 does not exceed the absolute maximum rated current Imax of the inductor L100. Further, in the above description, the absolute maximum rated current of the inductor L100 is described to be smaller than the absolute maximum rated current of the MOSFET Q101. On the contrary, when the absolute maximum rated current of the MOSFET Q101 is smaller than the absolute maximum rated current of the inductor L100, the absolute maximum rated current of the MOSFET Q101 is regarded as Imax so that the maximum duty Dmax can be calculated from the equations (2) and (3).

As described above, according to this embodiment, it is possible to prevent the switching element from being broken down when a load varies, with a simple structure. In other words, by controlling the duty for driving the MOSFET Q101 configured to drive the voltage resonance circuit so as not to exceed the maximum duty Dmax, it is possible to prevent the switching element from being broken down when the load is short-circuited, with a simple structure without increasing the number of components.

Second Embodiment

In the first embodiment, the voltage value of the power supply voltage Vcc is a predetermined voltage value. However, in general, the power supply voltage Vcc is not always a constant voltage value but varies and has a deviation. Therefore, in the first embodiment, it is practically necessary to set a margin for the deviation of the power supply voltage Vcc to Dmax as the calculated maximum value of the duty D. When the deviation of the power supply voltage Vcc is small, the set margin is small and an influence to the entire power supply voltage is small. However, when the deviation is large, it is necessary to set the margin to be large, which affects the output voltage. As a result, it may be necessary to increase the number of stages of the rectification circuit in order to obtain the necessary output voltage.

Therefore, a second embodiment of the present invention is described, in which, in view of the deviation of the power supply voltage Vcc, the maximum value Dmax of the duty D is variably set and duty D is controlled within a range of the set duty Dmax so that the output voltage of the high-voltage power supply apparatus is maintained to be constant.

[Structure of the High-Voltage Power Supply Apparatus]

Figure 5:
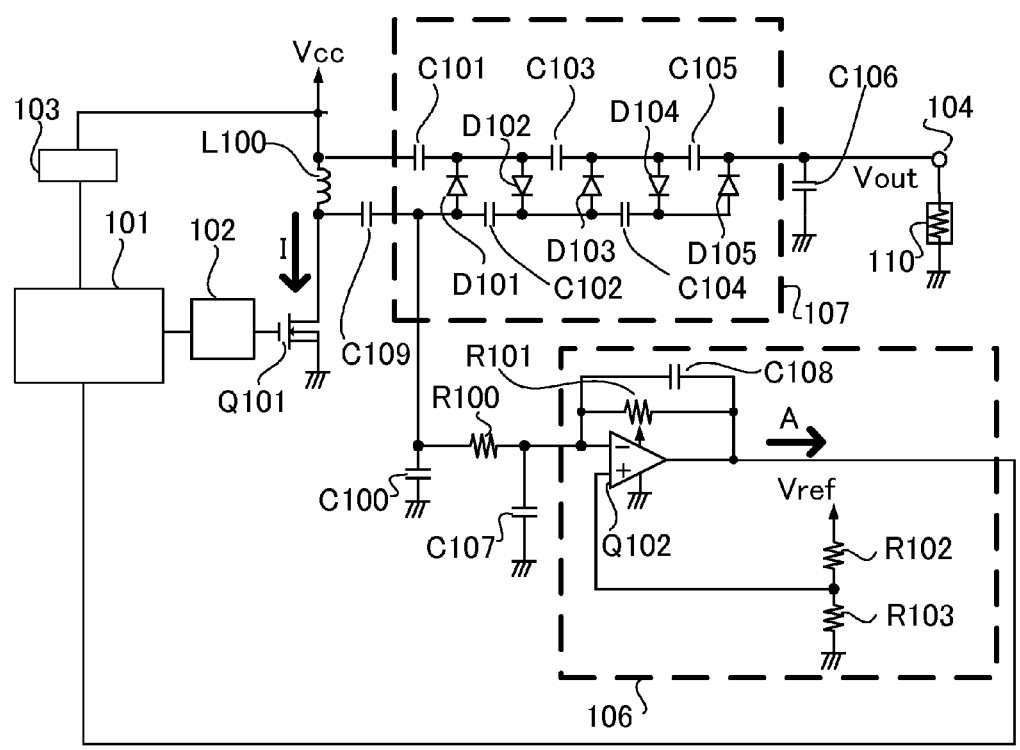
FIG. 5 is a circuit diagram illustrating a high-voltage power supply apparatus according to the second embodiment.

FIG. 5 is a circuit diagram of the high-voltage power supply apparatus of this embodiment. The circuit diagram of FIG. 5 is different from the circuit diagram of FIG. 1 in that a voltage detection unit 103 of the power supply voltage Vcc is added. The voltage detection unit 103 detects a voltage supplied from the power supply voltage Vcc terminal and outputs a voltage detection signal to the controller 101. The controller 101 outputs to the pulse output unit 102 the control signal with the duty D set based on the voltage detection signal from the voltage detection unit 103. The pulse output unit 102 outputs the drive signal with the duty D set in the control signal output from the controller 101 to the gate terminal of the MOSFET Q101 so as to drive the MOSFET Q101. Further, in FIG. 5, the same circuit structure as FIG. 1 is denoted by the same numeral or symbol, and hence description thereof is omitted here.

[Calculation of Maximum Value of Duty D]

Next, the calculation method of the maximum value Dmax of the duty D in this embodiment is described. Also in this embodiment, it is assumed that the absolute maximum rated current of the inductor L100 is smaller than the absolute maximum rated current of the MOSFET Q101. A relationship among the power supply voltage Vcc detected by the controller 101, the absolute maximum rated current Imax of the inductor L100, the inductance L of the inductor L100, and the maximum time period Tmax of the time in which the MOSFET Q101 is on state is expressed by the equation (2) described in the first embodiment. Here, values of Imax and L are constants determined by specifications of the inductor L100, and Vcc is a variable depending on the power supply voltage. Then, using the maximum time period Tmax calculated by the equation (2), the maximum value Dmax of the duty D is calculated from the equation (3).

[Control Sequence of Drive Signal]

Next, there is described a control sequence for the controller 101 to control the duty D of the drive signal for the MOSFET Q101 so as not to exceed the maximum value Dmax, with reference to a flowchart. FIGS. 6A to 6C are flowcharts illustrating the control sequence of the drive signal by the controller 101 in this embodiment. With reference to the flowcharts of FIGS. 6A to 6C, the control sequence of the drive signal is described.

In this embodiment, it is assumed that values of the absolute maximum rated current Imax of the inductor L100, the voltage Vcc, the inductance L of the inductor L100, and the cycle T of the drive signal are stored in the ROM, the values being used in the equations (2) and (3) for calculating the maximum duty Dmax. It is further assumed that, every time the process of FIGS. 6A to 6C is started, the controller 101 calculates the maximum duty Dmax based on these values read out from the ROM and the detected voltage of the power supply voltage Vcc. In addition, it is assumed that the target current value It as the current value supplied from the high-voltage power supply apparatus to the load 110 is stored in the RAM and is changed in accordance with a state of the load 110. Further, the ROM of the controller 101 stores a table in which the current value flowing through the load 110 and the duty D of the drive signal are associated with each other.

It is assumed that the control sequence illustrated in FIGS. 6A to 6C is started at the timing when the controller 101 controls the drive of the MOSFET Q101 via the pulse output unit 102 (for example, every drive cycle of the MOSFET Q101). First, in S200, the controller 101 detects the voltage detection signal output from the voltage detection unit 103. In S201, because the detected voltage detection signal is an analog signal, the controller 101 uses an A/D converter included therein for converting the voltage detection signal into a digital value and calculates a voltage value Vcc of the power supply voltage Vcc. Next, the controller 101 calculates the maximum duty Dmax by the method described above using the values of the absolute maximum rated current Imax of the inductor L100, the inductance L of the inductor L100, and the cycle T of the drive signal, which are stored in the ROM, and the calculated voltage value Vcc. Then, the controller 101 stores the calculated maximum duty Dmax in the RAM. When using a value of the maximum duty Dmax in the following process, a value stored in the RAM is used. The process in S202 and S203 is the same as S100 and S101 of the first embodiment illustrated in FIGS. 4A to 4C, and hence description thereof is omitted here.

In S204, the controller 101 determines whether or not the target current value It stored in the RAM is the same as the calculated current value Ad calculated in S203. When the controller 101 determines that the target current value It is the same as the calculated current value Ad, the process proceeds to S205. When the controller 101 determines that the target current value It is different from the calculated current value Ad, the process proceeds to S209. In S205, the controller 101 calculates the duty D corresponding to the target current value It stored in the RAM by using the table stored in the ROM described above. In S206, because the maximum duty Dmax may be changed, the controller 101 reads out the maximum duty Dmax calculated in S201 and stored in the RAM. Then, the controller 101 determines whether or not the duty D corresponding to the target current value It is the maximum duty Dmax or larger. When the controller 101 determines that the duty D corresponding to the target current value It is the maximum duty Dmax or larger, the process proceeds to S208. When the controller 101 determines that the duty D corresponding to the target current value It is smaller than the maximum duty Dmax, the process proceeds to S207. In S207, the controller 101 outputs the control signal with the duty D corresponding to the target current value It to the pulse output unit 102 and finishes the process. In S208, the controller 101 outputs the control signal with the duty that is the maximum duty Dmax to the pulse output unit 102 and finishes the process. The process of S209 to S216 is the same as the process of S105 to S112 of the first embodiment illustrated in FIGS. 4A to 4C, and hence description thereof is omitted.

By the above-mentioned control, even when the power supply voltage Vcc is changed, the current I flowing through the inductor L100 does not exceed the absolute maximum rated current Imax of the inductor L100. Further, in the above description, similarly to the first embodiment, the absolute maximum rated current of the inductor L100 is described to be smaller than the absolute maximum rated current of the MOSFET Q101. On the contrary, when the absolute maximum rated current of the MOSFET Q101 is smaller than the absolute maximum rated current of the inductor L100, the absolute maximum rated current of the MOSFET Q101 is regarded as Imax so that the maximum duty Dmax can be calculated by the equations (2) and (3).

In addition, in FIG. 5, the voltage detection unit 103 for the power supply voltage Vcc is disposed as another circuit different from the controller 101. However, it is possible to adopt a structure in which the voltage value of the power supply voltage Vcc is input to an A/D converter included in the controller 101.

Next, description is given of the fact that the rectification circuit 107 can output a constant output voltage Vout without being affected by a variation of the power supply voltage by changing the maximum value Dmax of the duty D in accordance with a variation of the power supply voltage Vcc.

The maximum value Dmax of the duty D can be calculated by the following equation (4) derived from the equations (2) and (3).

$$D\text{max} = |-L|/V cc \times I\text{max}/T \qquad (4)$$

In this embodiment, the controller 101 calculates the maximum value Dmax of the duty D by using the power supply voltage Vcc detected by the voltage detection unit 103 for the power supply voltage Vcc. It is understood from the equation (4) that the peak current Ipeak flowing through the inductor L100 when the duty D is the maximum value Dmax has the same current value as the absolute maximum rated current Imax.

Next, a relationship between the peak current Ipeak of the inductor L100 and the output voltage Vout of the rectification circuit 107 is described. When the duty D is increased, the time in which the MOSFET Q101 is on state is increased. As a result, the inductor L100 can store more energy. As described above, the inductor L100 and the capacitor C100 constitute the voltage resonance circuit. Then, the energy stored in the inductor L100 when the MOSFET Q101 is on state moves to the capacitor C100 when the MOSFET Q101 becomes off state. Therefore, the energy stored in the inductor L100 is equal to the energy moved and stored in the capacitor C100. Therefore, a relationship between the maximum voltage Vd generated in the voltage resonance circuit and the peak current Ipeak flowing through the inductor L100 when the duty D is the maximum value Dmax is expressed by the following equation (5).

$$\tfrac{1}{2} \times C \times Vd^2 = \tfrac{1}{2} \times L \times Ipeak^2 \qquad (5)$$

Further, the equation (6) is derived from the equation (5).

$$Vd = |\sqrt{(L/C)}| \times Ipeak \qquad (6)$$

As understood from the equation (6), even when the power supply voltage Vcc varies, the peak current Ipeak of the inductor L100 at the maximum value Dmax of the duty D is the same, and hence the generated resonance voltage Vd is also the same. Then, the output voltage Vout generated in accordance with the resonance voltage Vd is also the same voltage value. In other words, even when the power supply voltage Vcc varies, by changing the maximum value Dmax of the duty D in accordance with the varied power supply voltage Vcc, it is possible to maintain the peak current Ipeak to be the same current value so that a constant voltage can be output as the output voltage Vout.

As described above, according to this embodiment, it is possible to prevent the switching element from breaking down when a load varies, with the simple structure.

Third Embodiment

The high-voltage power supply apparatus described in the first and second embodiments can be used as a power supply for supplying high-voltage power to an image forming apparatus, for example. Now, a structure of the image forming apparatus is described, to which the high-voltage power supply apparatus of the first and second embodiments is applied.

[Structure of Image Forming Apparatus]

Figure 7:
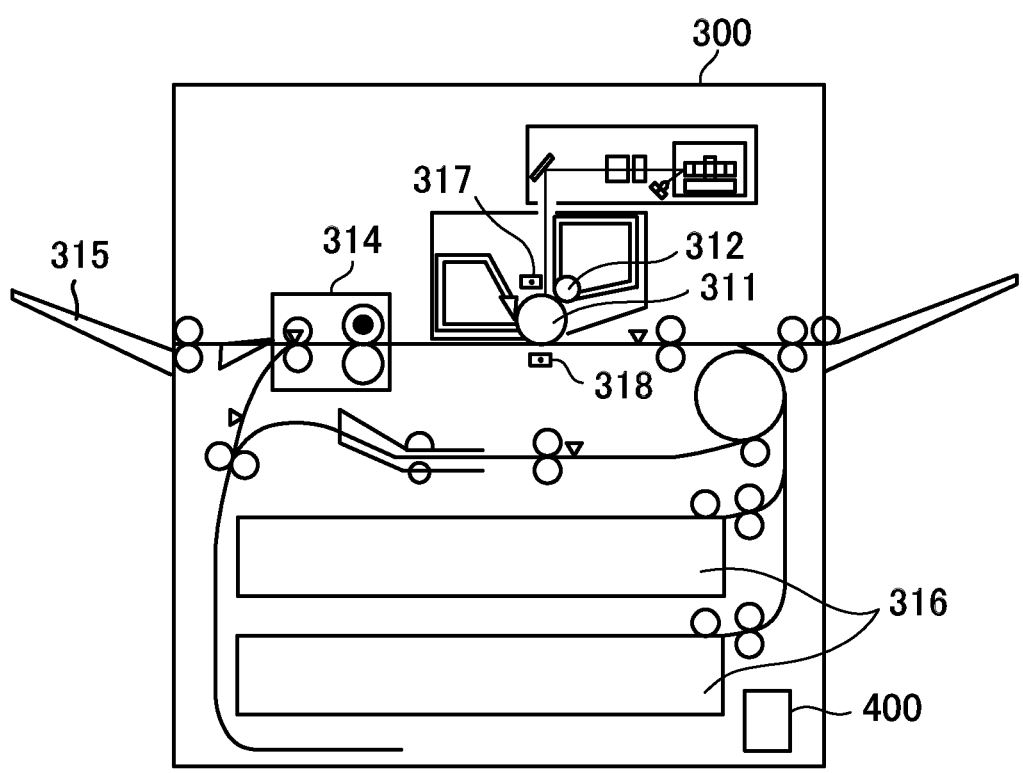
FIG. 7 is a diagram illustrating a schematic structure of a laser beam printer according to a third embodiment of the present invention.

As an example of the image forming apparatus, a laser beam printer is exemplified and described. FIG. 7 illustrates a schematic structure of the laser beam printer as an example of an electrophotographic printer. A laser beam printer 300 includes a photosensitive drum 311 as an image bearing member on which an electrostatic latent image is formed, a charging unit 317 for uniformly charging the photosensitive drum 311, and a developing unit 312 for developing the electrostatic latent image formed on the photosensitive drum 311 by toner. Then, the toner image developed on the photosensitive drum 311 is transferred by a transfer unit 318 onto a recording material (not shown) as a recording material supplied from a cassette 316. Then, the toner image transferred onto the recording material is fixed by a fixing unit 314, and the recording material is discharged onto a tray 315. The photosensitive drum 311, the charging unit 317, the developing unit 312, and the transfer unit 318 form an image forming unit. In addition, the laser beam printer 300 includes a high-voltage power supply apparatus 400 described above in the first and second embodiments. Further, the image forming apparatus to which the high-voltage power supply apparatus of the first and second embodiments can be applied is not limited to one exemplified in FIG. 7 and may be an image forming apparatus including multiple image forming units. Further, the image forming apparatus may include a primary transfer unit for transferring the toner image on the photosensitive drum 311 onto an intermediate transfer belt, and a secondary transfer unit for transferring the toner image on the intermediate transfer belt onto the recording material.

In the laser beam printer 300, the charging unit 317, the developing unit 312, and the transfer unit 318 constituting the image forming unit use the high voltage supplied from the high-voltage power supply apparatus 400. In other words, the high voltage is applied to the charging member for uniformly charging the image bearing member, to the developing member for developing the latent image formed on the image bearing member by using toner as developer, and to the transfer member for transferring the toner image formed on the image bearing member onto the recording material, so as to perform image formation. Further, the load 110 of the first and second embodiments corresponds to the members of the charging unit 317, the developing unit 312, and the transfer unit 318. In addition, the laser beam printer 300 includes a controller (not shown) for controlling the image forming operation by the image forming unit and the transport operation of the recording material. In the first and second embodiments, the controller 101 controls the output voltage of the high-voltage power supply apparatus. However, instead of the controller 101, for example, the controller (not shown) of the laser beam printer 300 may control the output voltage of the high-voltage power supply apparatus in accordance with the image forming operation.

As described above, according to this embodiment, it is possible to prevent the switching element from breaking down when a load varies, with a simple structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146374, filed Jul. 12, 2013, which is hereby incorporated by reference herein in its entirety.

What is claimed is:

1. A high-voltage power supply apparatus for generating a high voltage, comprising:
    a driving unit driven by a drive signal at a predetermined frequency;
    an inductor connected to the driving unit, wherein a voltage is applied into the inductor by driving the driving unit;
    a rectification unit connected to the inductor, the rectification unit including capacitors and diodes;
    a current detection unit that detects a current flowing through the rectification unit; and
    a control unit configured to change a turn-on time of the drive signal within a period of one cycle of the drive signal based on the current detected by the current detection unit.

2. A high-voltage power supply apparatus according to claim 1, wherein a maximum value of the turn-on time of the drive signal is determined based on the voltage applied to the inductor, an inductance of the inductor, and a predetermined rated current value of the inductor.

3. A high-voltage power supply apparatus according to claim 1, further comprising:
   a capacitor connected to the inductor; and
   a voltage detection unit that detects a voltage applied to a voltage resonance unit including the inductor and the capacitor,
   wherein the control unit determines a maximum value of the turn-on time of the drive signal based on the voltage detected by the voltage detection unit.

4. A high-voltage power supply apparatus according to claim 1, wherein the rectification unit comprises a multistage voltage doubler rectification circuit configured to step up a voltage generated across the inductor.

5. A high-voltage power supply apparatus according to claim 1, wherein the driving unit comprises a field-effect transistor.

6. An image forming apparatus, comprising:
   an image forming unit that forms an image; and
   a high-voltage power supply that supplies a high voltage to the image forming unit,
   wherein the high-voltage power supply includes:
   a driving unit driven by a drive signal at a predetermined frequency;
   an inductor connected to the driving unit, wherein a voltage is applied to the inductor by driving the driving unit;
   a rectification unit connected to the inductor, the rectification unit including capacitors and diodes;
   a current detection unit that detects a current flowing through the rectification unit; and
   a control unit configured to change a turn-on time of the drive signal within a period of one cycle of the drive signal based on the current detected by the current detection unit.

7. An image forming apparatus according to claim 6, wherein a maximum value of the turn-on time of the drive signal is determined based on the voltage applied to the inductor, an inductance of the inductor, and a predetermined rated current value of the inductor.

8. An image forming apparatus according to claim 6, further comprising:
   a capacitor that connects to the inductor; and
   a voltage detection unit that detects a voltage applied to a voltage resonance unit including the inductor and the capacitor,
   wherein the control unit determines a maximum value of the turn-on time of the drive signal based on the voltage detected by the voltage detection unit.

9. An image forming apparatus according to claim 6, wherein the rectification unit comprises a multistage voltage doubler rectification circuit configured to step up a voltage generated across the inductor.

10. An image forming apparatus according to claim 6, wherein the image forming unit comprises a charging unit configured to charge an image bearing member, a developing unit configured to develop a latent image formed on the image bearing member using toner as developer, and a transfer unit configured to transfer a toner image formed on the image bearing member onto a recording material; and
   the high-voltage power supply supplies a voltage to at least one of the charging unit, the developing unit, or the transfer unit.

* * * * *